US012140346B2

(12) United States Patent
O'Toole et al.

(10) Patent No.: US 12,140,346 B2
(45) Date of Patent: Nov. 12, 2024

(54) SYSTEM AND METHOD FOR WORK RECOVERY IN A HEAT PUMP

(71) Applicant: EXERGYN LTD., Dublin (IE)

(72) Inventors: Kevin O'Toole, Dublin (IE); Keith Warren, Dublin (IE); Richard Blackburn, Dublin (IE); Greg Pittam, Dublin (IE); Neil Dwyer, Dublin (IE); Michael Langan, Dublin (IE)

(73) Assignee: EXERGYN LTD., Dublin (IE)

( * ) Notice: Subject to any disclaimer, the term of this patent is extended or adjusted under 35 U.S.C. 154(b) by 299 days.

(21) Appl. No.: 17/632,415

(22) PCT Filed: Aug. 2, 2020

(86) PCT No.: PCT/EP2020/071754
§ 371 (c)(1),
(2) Date: Feb. 2, 2022

(87) PCT Pub. No.: WO2021/023688
PCT Pub. Date: Feb. 11, 2021

(65) Prior Publication Data
US 2022/0299243 A1 Sep. 22, 2022

(30) Foreign Application Priority Data
Aug. 2, 2019 (GB) ..................................... 1911107
Aug. 2, 2019 (GB) ..................................... 1911109

(51) Int. Cl.
*F25B 30/04* (2006.01)
*F03G 7/06* (2006.01)
(Continued)

(52) U.S. Cl.
CPC ............ *F25B 30/04* (2013.01); *F03G 7/0614* (2021.08); *F03G 7/062* (2021.08); *F03G 7/0646* (2021.08); *F25B 23/00* (2013.01); *F25B 30/00* (2013.01)

(58) Field of Classification Search
CPC ...... F03G 7/0614; F03G 7/062; F03G 7/0646; F25B 23/00; F25B 30/00; F25B 30/04
See application file for complete search history.

(56) References Cited

U.S. PATENT DOCUMENTS

| 4,353,218 A | 10/1982 | Wheatley et al. |
| 10,018,385 B2 | 7/2018 | Radermacher et al. |

(Continued)

FOREIGN PATENT DOCUMENTS

| CN | 106052190 A | 10/2016 |
| CN | 107289668 A | 10/2017 |

(Continued)

OTHER PUBLICATIONS

Machine English language translation of JP 2015068604 to Daikin Ind Ltd (translated Sep. 2023) (Year: 2015).

*Primary Examiner* — Jonathan Bradford
(74) *Attorney, Agent, or Firm* — Nixon Peabody LLP

(57) ABSTRACT

The heat pump system and method for operating a heat pump system includes a first Shape-Memory Alloy (SMA) or Negative Thermal Expansion (NTE) core that is adapted to convert movement of the core into energy in response to a temperature change. A second Shape-Memory Alloy (SMA) or Negative Thermal Expansion (NTE) core is in fluid communication with the first core and adapted to convert movement of the second core into energy. A third Shape-Memory Alloy (SMA) or Negative Thermal Expansion (NTE) or elastocaloric core is in fluid communication with the first and second cores and adapted to convert movement of the third core into energy. The first core, (Continued)

second core and the third core are arranged in series and a control system provides waste pressure from the first core to the second core and/or third core.

8 Claims, 18 Drawing Sheets

(51) Int. Cl.
  *F25B 23/00* (2006.01)
  *F25B 30/00* (2006.01)

(56) References Cited

U.S. PATENT DOCUMENTS

| | | |
|---|---|---|
| 10,119,059 B2 | 11/2018 | Cui et al. |
| 11,454,429 B2 | 9/2022 | Bartholome et al. |
| 11,656,008 B2 | 5/2023 | Langan et al. |
| 2016/0084544 A1 | 3/2016 | Radermacher et al. |
| 2016/0208783 A1 | 7/2016 | Cullen et al. |
| 2022/0299243 A1* | 9/2022 | O'Toole .................. F25B 23/00 |

FOREIGN PATENT DOCUMENTS

| | | | |
|---|---|---|---|
| CN | 107421096 | A | 12/2017 |
| EP | 3317535 | B1 | 5/2018 |
| GB | 2497542 | A | 6/2013 |
| GB | 2533357 | A | 6/2016 |
| JP | H0650259 | A | 2/1994 |
| JP | 2000266441 | A | 9/2000 |
| JP | 2015068604 | A | 4/2015 |
| WO | 2014198904 | A1 | 12/2014 |
| WO | 2017001521 | A1 | 1/2017 |
| WO | 2018229231 | A1 | 12/2018 |

* cited by examiner

SYSTEM AND METHOD FOR WORK RECOVERY IN A HEAT PUMP

CROSS-REFERENCE TO RELATED APPLICATIONS

This application is a 35 U.S.C. § 371 National Phase Entry Application of International Application No. PCT/EP2020/071754 filed Aug. 2, 2020, which designates the U.S. and claims benefit under 35 U.S.C. § 119(a) of GB Provisional Application No. 1911107.9 filed Aug. 2, 2019 and GB Provisional Application No. 1911109.5 filed Aug. 2, 2019, the contents of which are incorporated herein by reference in their entireties.

FIELD

This disclosure relates to a heat pump. In particular this disclosure relates to a heat pump for heating systems and/or cooling systems such as an air conditioning, refrigeration or cryogenic systems.

BACKGROUND

Heat Pump ("HP") technologies have gained wide commercial acceptance in heating, ventilation & air conditioning ("HVAC") applications. They can offer energy savings and emissions reductions and are typically installed for heating and cooling systems in buildings or car applications etc.

There are several types of heat pump. Most existing technologies utilise a refrigerant in an expansion/compression cycles, many heat pumps are classified by the source of the heat e.g. air source heat pump or ground source heat pump. The fundamental technology used in the heat pump is similar. Air source heat pumps have limited performance in cold temperature (at −18° C., CoP tends to be around 1 (due to Carnot) so electrical resistance heating is more effective, at higher operating temperatures the CoP can reach 4). Ground Source heat pumps have more stable inlet temperature but are limited by the Coefficient of Performance ("CoP") of present technology.

There is a global need to decarbonise heating and cooling in buildings. Heating generally uses combustion of carbon-based fuel, which releases carbon into the atmosphere. Cooling and air conditioning can be a major electrical load in warmer climates. Heat pumps can potentially deliver heating and cooling from a single package. If a heat pump uses renewable electricity, then it can be a zero-emission technology. Current heat pump technologies generally use refrigerants with high global warming potential and can have high toxicity, which is undesirable. Fans and pumps have a noise signature which can be intrusive. Current HP technology has a CoP of 3 to 4. By increasing the CoP, electricity consumption can be reduced, this reduces carbon emissions if non-renewable electricity is used. Moreover, conventional HP technologies can have a CoP which is affected by ambient air temperature which is undesirable. US Patent publication number US20160084544, Radermacher et al, discloses a heat pump system that uses SMA material tubes, and are filled with other tubes or rods of an unknown material to take up volume and to therefore remove dead thermal mass to help boost he efficiency of the system. US patent publication number US2016/0208783, assigned to Exergyn Limited, discloses a pressure relief system in an energy recovery device where heat from water is absorbed by a SMA device and the change in state of the SMA device causes energy to be harvested.

The heat pump market is set to grow as heat pumps provide a clean alternative to fossil fuel heating technology and they are currently used in most air conditioning and refrigeration. Basic heat pumps cannot operate at part load and have poor efficiency in periods of part load demand. Heat pumps tend to operate in variable climates and either operate in an on/off mode or may operate at part load. Part load operation tends to be more efficient. In vapour compression (VC) technology, additional components are required to operate at part load, these increase the cost and price of the product. As most heating and cooling technology is specified for extreme peak conditions then it can operate at part load for most of the time. Cooling is a major energy demand and maximising efficiency for cooling has a significant impact on the costs of installing generator capacity and reinforcing grids. Use of inverter/variable speed drives improves part load performance but can increase the price of the product by up to 40%.

It is therefore an object to produce a heat pump system that produces a large increase in Coefficient of Performance (CoP). It is another object to provide an improved cooling system.

SUMMARY

According to the invention there is provided, as set out in the appended claims, a heat pump system and method comprising:
  a first Shape-Memory Alloy (SMA) or Negative Thermal Expansion (NTE) or elastocaloric material core and adapted to convert movement of the core into energy in response to a temperature change;
  a second Shape-Memory Alloy (SMA) or Negative Thermal Expansion (NTE) elastocaloric material core in fluid communication with the first core and adapted to convert movement of the second core into energy;
  a third Shape-Memory Alloy (SMA) or Negative Thermal Expansion (NTE) core or Negative Thermal Expansion (NTE) elastocaloric material core in fluid communication with the first and second cores and adapted to convert movement of the third core into energy, and
  wherein the first core, second core and the third core are arranged in series and a control system provides waste pressure from the first core to the second core and/or third core.

Work recovery is fundamental to achieving a good system coefficient of performance. The present invention provides a system and method to maximise work recovery in a system operated by either a hydraulic or electrically loaded actuator system. The minimisation of the waste pressure returned to tank means the system CoP is dramatically enhanced.

In one embodiment each core in sequence comprises a positive pressure gradient, reaching equilibrium at a lower pressure by utilising the waste pressure available in the first core.

In one embodiment there is provided an accumulator wherein pressure accumulated in the accumulator in preparation for release into a core requiring loading to ensure that the rate of heat change is maximised.

In one embodiment the control system comprises an intensifier.

In one embodiment the intensifier comprises a reverse intensifier configured with two interconnected areas subject to pressure.

In one embodiment the intensifier is in communication with the first core, second core and third cores.

In one embodiment there is provided a hydraulic motor and electrical generator where the pressure is converted into usable electricity, and subsequently used for the electrical load required to operate the heat pump system.

In one embodiment the series of cores a fluid provides the temperature change to activate either the first, second or third cores such that the cycle time for activating at least one core is reduced.

In one embodiment there is provided a fourth Shape-Memory Alloy (SMA) or Negative Thermal Expansion (NTE) core or elastocaloric material core in fluid communication with the first, second and third cores and adapted to convert movement of the fourth core into energy.

In one embodiment a plurality of multiple hydraulic cavities in a multi-core system for load sharing and energy recovery can be provided. When a core is loaded in compression or tension, some of this accumulated energy can be recovered. However when two cores each with one cavity are load-shared (one being loaded, one unloaded at time=0) then if the two cores are linked, there will only be a pressure balance meaning at most 50% energy recovery. If each core was made with a multitude of hydraulic chambers of various active surface areas (say numbered 1-2-3) then each core can recover more than 50%.

In one embodiment there is provided a control system to link two or more cores together, and the pistons being linked 1-3, 2-2, 3-1 in time in this instance. 1 being the smallest surface area, 3 being the largest. Any multiple can be used but the invention being to have multiple core hydraulic piston areas, and dynamically change this linking between cores during a cycle.

In another embodiment there is provided a heat pump system comprising
- a Shape-Memory Alloy (SMA) or Negative Thermal Expansion (NTE) elastocaloric material core positioned in a housing;
- the housing is configured to receive a fluid at a first temperature via an inlet, and a stress via a hydraulic circuit acting on the core. This stress causes the SMA or NTE or elastocaloric material core to change from a first state to second state at an activation point; and
- a control device is configured to apply a variable stress on the SMA or NTE or elastocaloric material core in the housing to cause the SMA or NTE or elastocaloric material core to change from the first state to the second state, wherein the control device is configured to initially apply a variable stress below the activation point.

The invention provides a heat pump delivers high part load efficiency by controlling the load applied. This delivers significantly higher part load efficiency than can be achieved with traditional vapour compression (VC) heat pumps. There is little increase in cost (unlike VC heat pumps where the cost can increase by 40%). Stored energy e.g. in the hydraulic transmission, can be used to "soft-start" the heat pump and avoid major starting loads which can be problematic for distribution grid operators.

In one embodiment the control device comprises a hydraulic circuit.

In one embodiment the hydraulic circuit comprises an electro-proportional control valve/regulator configured to variably control hydraulic pressure or flow to stress the SMA or NTE or elastocaloric material core.

In one embodiment the electro-proportional control valve/regulator is configured to cycle pressures to be adjusted in response to varying temperatures of the fluid.

In one embodiment the hydraulic circuit comprises a hydraulic ram configured to provide a controlled stress to the core.

In one embodiment the valve allows the pressure on the hydraulic ram to be regulated by a load regulator.

In one embodiment there is provided one or more sensors and provide information to the hydraulic circuit determine the appropriate response to regulate the pressure or fluid downstream.

In one embodiment a second hydraulic ram is configured to apply a variable stress to a second core.

In one embodiment the electro-proportional control valve/regulator is configured to control the first and second hydraulic ram in response to one or more sensor readings.

In one embodiment there is provided a first pressure sensor is configured to measure pressure at the first hydraulic ram and second pressure sensor is configured to measure pressure at the second hydraulic ram.

In one embodiment the control circuit comprises an accumulator adapted to store energy, wherein the stored energy is used to supply the energy to apply the variable stress.

In one embodiment the SMA or NTE or elastocaloric material core and is adapted to absorb or release heat and/or store energy in response to the hydraulic load/stress applied.

The pressure or stress applied to one or more cores can be applied by a hydraulic circuit, however it will be appreciated that the pressure can be applied by other mechanisms, such as pneumatic, linear/electro mechanical actuators, rotary/screw actuators, SMA actuators.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
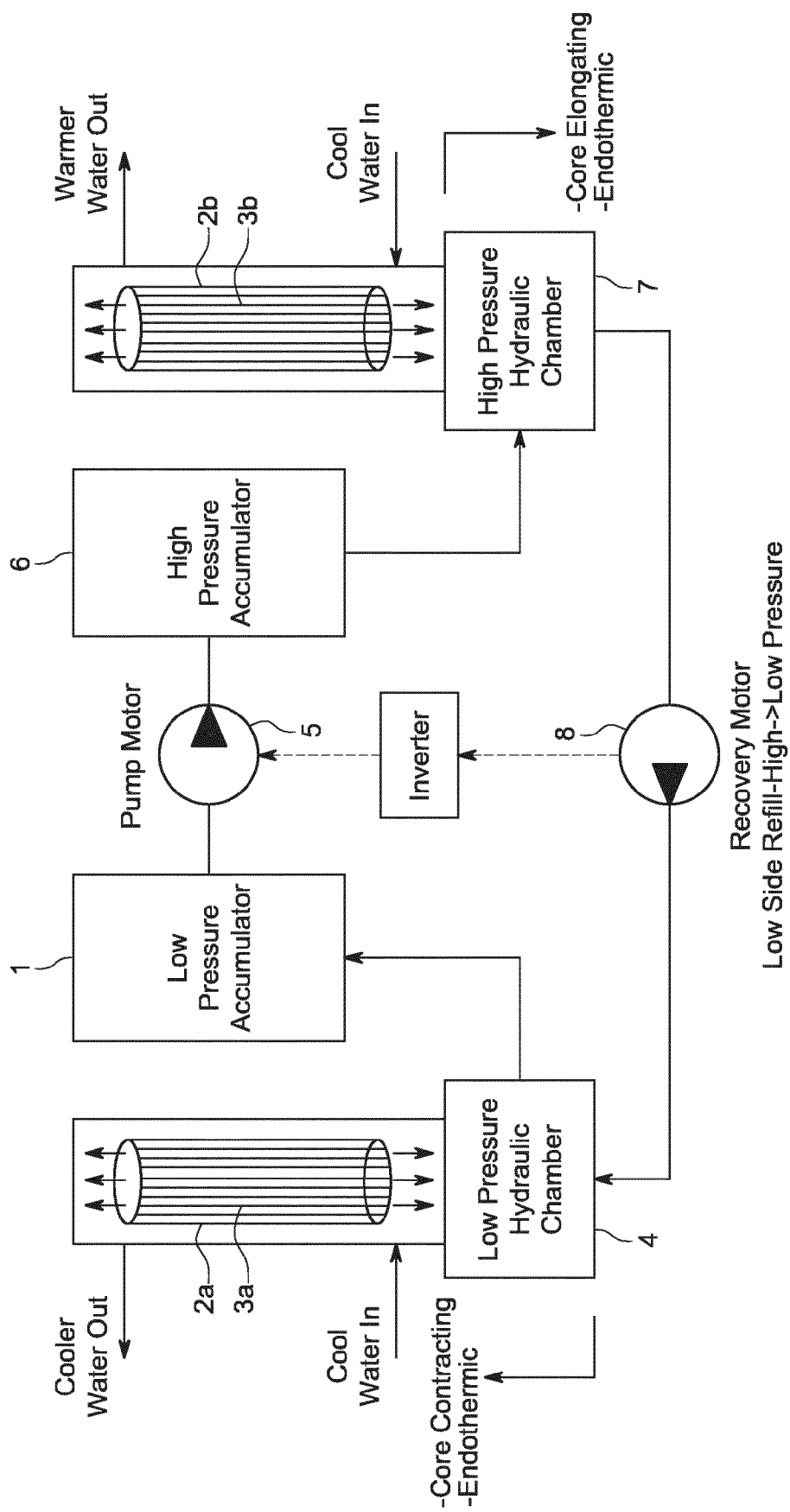
FIG. 1 illustrates a heat pump system incorporating a mechanical configuration of SMA or NTE or elastocaloric cores and a transmission system.

The invention relates to a new heat pump cycle which utilises the latent heat from a phase transformation of shape memory alloys ("SMA") or Negative Thermal Expansion materials (NTE) or elastocaloric materials. The following description of a preferred embodiment of the invention describes a SMA implementation and equally applies to Negative Thermal Expansion materials (NTE) or elastocaloric material implementations.

The invention can use a particular SMA configuration made up of a plurality of elements wires, plates, ribbons packed closely together to define a core. SMA material can exist in at least two crystalline states, martensite austenite, R-phase, and can be reversibly converted from one phase to the other. The austenite to martensite transition of SMA is exothermic. The martensite to austenite transition is endothermic. The temperatures at which the phase change occurs can be manipulated via the application of stress to the SMA material.

A Shape-memory Alloy (SMA) is an alloy that exhibits a shape memory effect which once deformed returns to its pre-deformed shape upon heating. This material is a lightweight, solid-state alternative to conventional actuators such as hydraulic, pneumatic, and motor-based systems.

The invention relates to a heat pump system and method which can use either Shape-Memory Alloys (SMAs) or Negative Thermal Expansion materials (NTE) or elastocaloric material. In one embodiment a particular SMA system made up of SMA material can be used. For example, a plurality of elements (or a plurality of groups of elements) or wires packed closely together to define a core. In another example the core can be made up of one or more of the following rod, block, ribbon, strip or plates, 3D printed elements and the like all capable of being subjected to compression, axially or laterally, compression and natural loading, torsional stress to function as a core.

A heat pump has two individual phases—heat absorption and heat release. The machine cycle is defined as a full heat absorption phase (endothermic) and a full heat release phase (exothermic).

The heat absorption phase allows for the transfer of heat into the SMA material by setting the stress applied to the material to an appropriate value, the lower value used in the cycle of operation. This results in the activation temperatures, austenite start ($A_s$) and austenite finish ($A_f$), being set to a value below the input temperature of fluid stream. The thermal gradient present therefore allows the heat to transfer into the SMA via conduction and convection. Once the material has fully or partially transformed to austenite (i.e. the temperature of the SMA material is above $A_f$), the heat absorption phase is complete.

The heat release phase begins after increasing the stress on the austenitic SMA material. This raises the activation temperatures, martensite start ($M_s$) and martensite finish ($M_f$), for the reverse transformation back to martensite. Once the value of $M_s$ is raised above the input fluid stream temperature, the reverse transformation begins. It will only complete in full when $M_f$ also raised above the fluid stream temperature. The latent heat is then released by the SMA material and into the fluid stream, raising its temperature. The rate at which the release of heat occurs is a function of the thermal gradient and various thermodynamic conditions of the fluid stream, such as flow rate, turbulence etc.

A single fluid temperature input can be used in the system, and a series of valves can be used at the output of the chamber to direct the colder fluid flow from the heat absorption phase back to source, while directing the warmer fluid from the heat release phase to the heating target. Multiple working fluid temperature inputs can also be used.

FIG. 1 illustrates a Heat Pump system incorporating a known SMA drive engine configuration but operated in reverse and described in unpublished PCT patent application number PCT/EP2019/052300, assigned to Exergyn Limited, and fully incorporated herein by reference.

Figure 2:
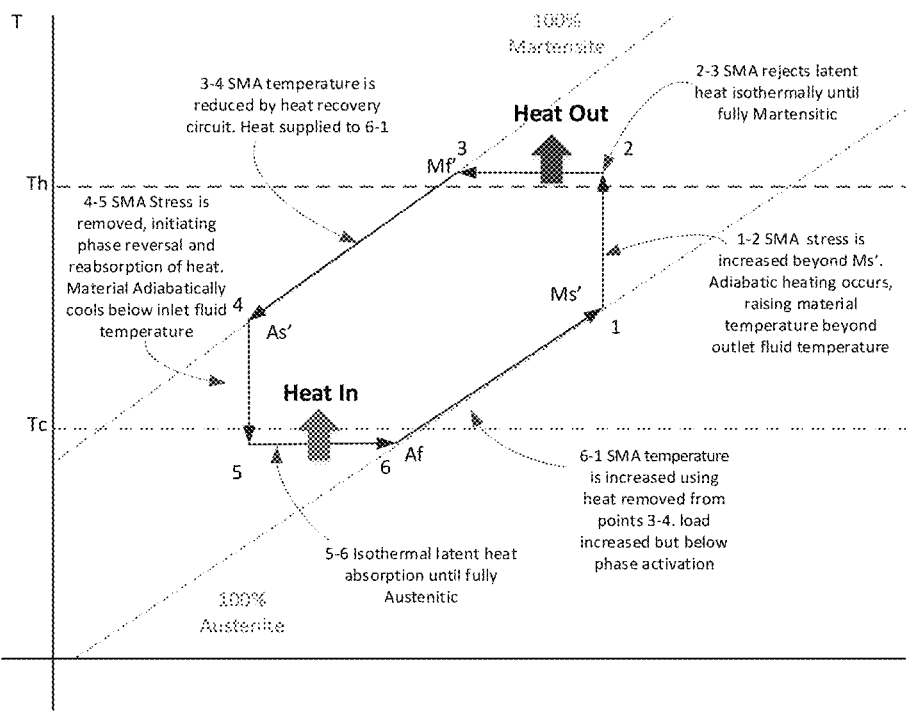
FIG. 2 shows an ideal temperature-entropy diagram for an elastocaloric heat pump cycle illustrating the operation cycle according to one embodiment of the invention.

FIG. 2 shows an ideal temperature-entropy diagram for an elastocaloric heat pump cycle illustrating the operation cycle according to one embodiment of the invention. The cycle removes heat from a Heat transfer fluid (HTF) at temperature Tc between point 5-6 and rejects heat to a higher temperature fluid Th between point 2-3. Heat is absorbed by heat recovery circuit between point 3-4 causing the material to cool and reabsorbed by the material between 6-1 causing it to heat.

Work recovery is a key process required to achieve maximum CoP in a solid-state/SMA/elastocaloric heat pump/refrigeration system. This can be achieved by allowing waste pressure exiting one SMA core chamber (Core 1) to enter a subsequent chamber (Core 2) that is preparing for, or undergoing, its loading component in the cycle. The net result of this is a decrease in the amount of input work required into the system required to activate Core 2 whilst maintaining the same Qout. Therefore the coefficient of performance is increased.

However, under normal circumstances, the maximum pressure that can be transferred from one core to the next is 50% (assuming no losses in the transmission line). This is so because the both cores pressurise and reach equilibrium with each other and at that point, the impetus to perform work is reduced to zero. The remaining 50% of the waste pressure in core 1 therefore must be returned to tank.

The present invention improves work recovery. In a first embodiment the heat pump system comprises a continuous deposition of waste pressure in a series of cores. In a second embodiment the invention utilises an intensifier in reverse to convert lower pressures to higher pressures and thus add pressure to second core. In a third embodiment the heat pump system uses an electrical conversion unit.

In a first aspect of the invention to improve work recovery is to share the available waste pressure over a series of cores that are exposed in sequence to a first core.

The invention works by having at least three or more cores arranged in sequence. The net effect of this is each core in sequence has a positive pressure gradient, reaching equilibrium at lower pressures and therefore utilising more of the waste pressure available in the first core.

Figure 3:
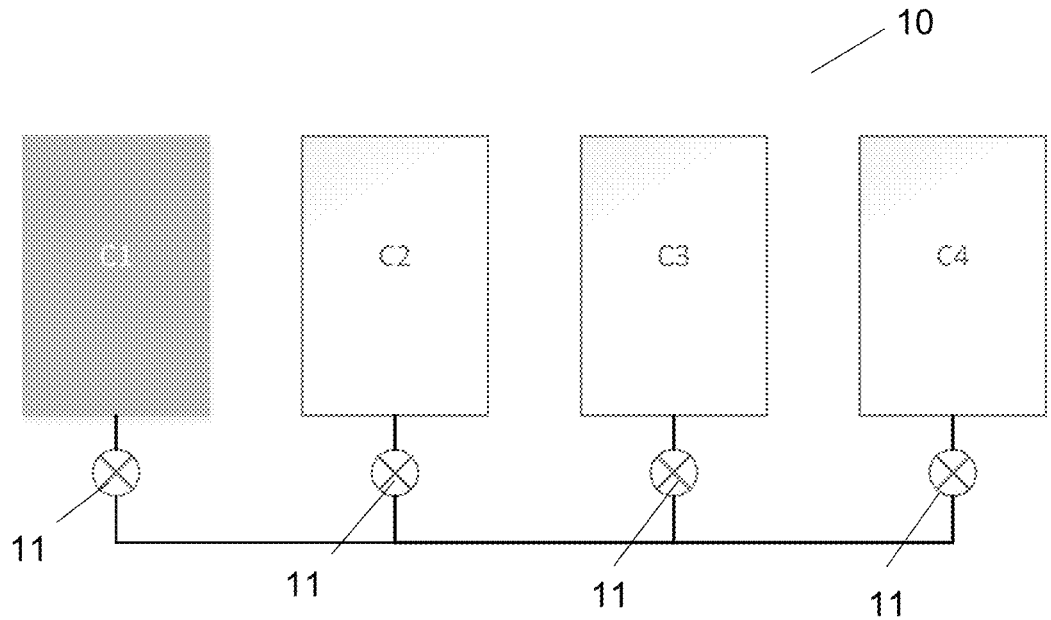
FIGS. 3 to 6 illustrates a plurality of cores in a heat pump system arranged in series showing operation of the invention.

FIG. 3 illustrates a heat pump system indicated by reference numeral 10 with four cores, C1, C2, C3 and C4, each core connected to a valve 11. In sequence the four cores works as follows (assuming ideal conditions, no losses, Core pressures represented as percentages of the initial core pressure):

Initial Cycle

Step 1 (C2-C4 closed): C1=100, C2=0, C3=0, C4=0 is illustrated in FIG. 3.

Figure 4:
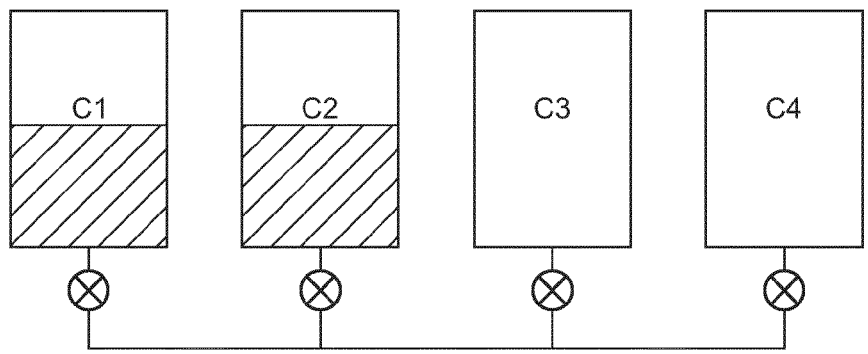

Step 2 (C2 open, C3-C4 closed): C1=50, C2=50, C3=0, C4=0, is illustrated in FIG. 4.

Figure 5:
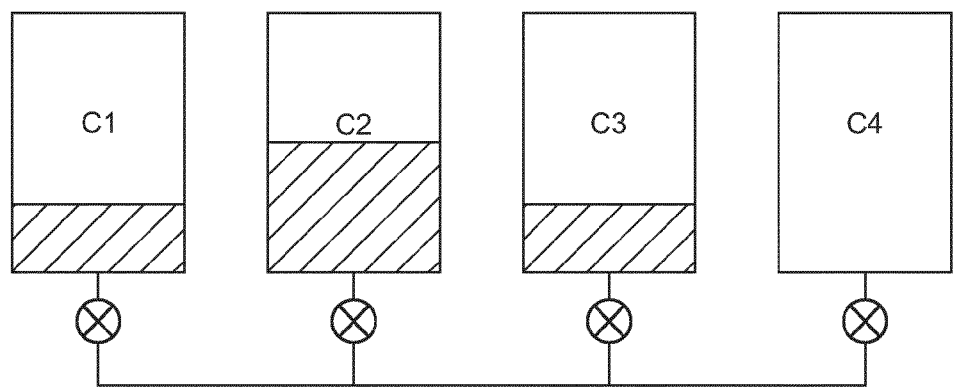

Step 3 (C2 closed, C3 open, C4 closed): C1=25, C2=50, C3=25, C4=0, is illustrated in FIG. 5.

Figure 6:
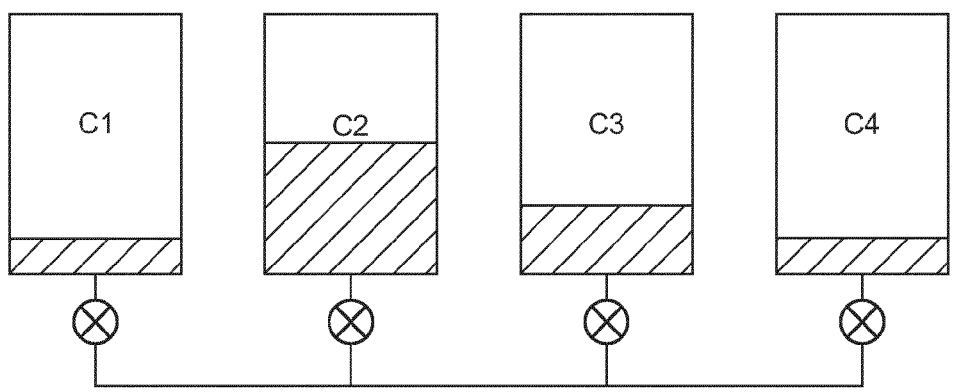

Step 4 (C2-C3 closed, C4 open): C1=12.5, C2=50, C3=25, C4=12.5, is illustrated in FIG. 6.

After step 4, the remaining 12.5% of waste pressure in C1 is dumped back to tank (if it cannot be utilised elsewhere in the system, such as producing electrical energy when run across a recovery motor). The pressure in C2 is required to be increased by 50%, which is sourced from the input pump. However, on the second cycle, the system becomes more favourable as follows:

In the second cycle the following happens in each core:

Step 1 (C1 dumped to tank, C2 up to 100% by pump): C1=0, C2=100, C3=25, C4=12.5

Step 2 (C1 closed, C3 open, C4 closed): C1=0, C2=62.5, C3=62.5, C4=12.5

Step 3 (C1+C3 closed, C4 open): C1=0, C2=37.5, C3=62.5, C4=37.5

Step 4 (C1 open, C3-C4 closed): C1=18.75, C2=18.75, C3=62.5, C4=37.5

This trend continues until the pressure balance in the cores balances per the following relationship:

Maximum ideal work recovery (%)=100-100/No. of cores in work sharing sequence (Eq.1)

Therefore, for a four core sequence, the maximum work recovery achievable is 75% and for an eight core sequence is 87.5%. Additional cores will result in additional pressure transmission losses and general system entropy, therefore, in a realistic scenario, a point will be reached where the benefits of increasing the sequenced core number will counterbalance any gains.

It will be appreciated that the triggering of the valves associated with C1 — C4 cores can be configured to lock some pressure in each or some of the cores and to select the best waste pressure shuttling between cores to maximise the recovery.

In some embodiments it is necessary to store the pressure accumulated in a small accumulator in preparation for release into the core requiring loading to ensure that the rate of heating, and thus the ultimate temperature the SMA can achieve is maximised.

To further boost the work recovery, a reverse intensifier can be utilised to make some use of the pressure being dumped to tank. In the case of an ideal four core sequence, the pressure being dumped to tank (and thus requiring to be replenished by the pump) is 25% of the original pressure in the core (once the system stabilises). It will be appreciated that the triggering of one or more of the valves can be configured to lock some pressure in cores and to select the best waste pressure shuttling between cores to maximise the recovery.

Figure 7:
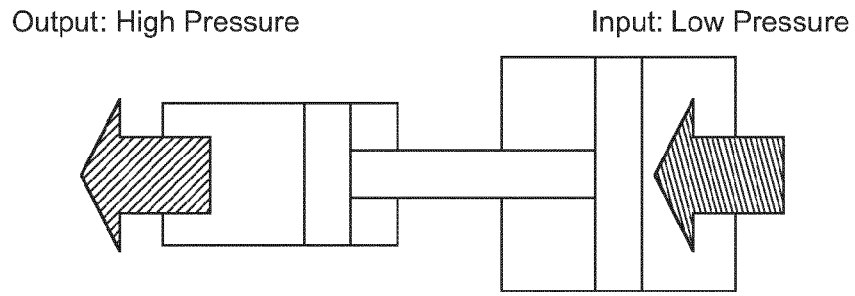
FIG. 7 illustrates an intensifier that can be connected to first, second and third core according to one embodiment of the invention.

A reverse intensifier utilises two interconnected areas subject to pressure as shown in FIG. 7. The ratio of the large surface to the small surface area represents the ideal increase in pressure achieved by utilising the device.

The cost of an 'intensified' pressure is a loss in volume. Such a system can be used between the hydraulic fluid being dumped to tank and the next core in sequence requiring a higher pressure. The system will then increase the pressure in the subsequent core whilst reducing the waste being dumped to tank. This increases system efficiency. The net result in a four core sequence would be a favourable shift in the required input work from the hydraulic pump.

Taking Eq.1, a four core sequence system as outlined in Invention 1 can achieve a maximum work recovery of 75% with 25% being lost and requiring to be replenished as work input. The reverse intensifier will increase the maximum work recovery to >75% and therefore the losses to <25%.

A single intensifier in the multiple-core sequence can be used in rotation, it is not necessary to have a single intensifier attached to each core in the system due to the cyclical nature of its usage.

An option instead of using an intensifier would be to run the remaining pressure over a hydraulic motor and electrical generator setup, where the pressure gets converted into usable electricity, offsetting the electrical load required to operate the system.

Hydraulic Embodiment

Figure 8:
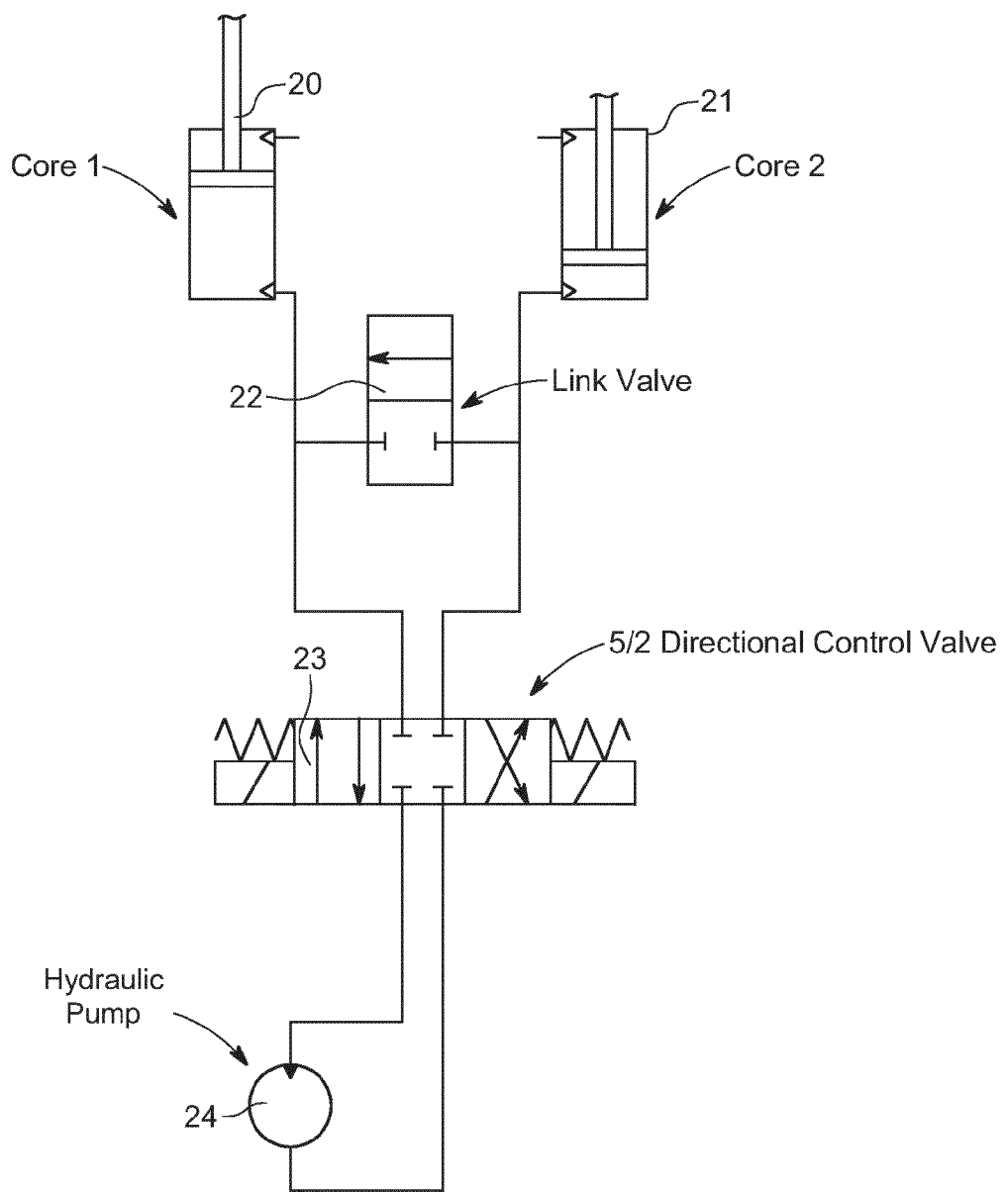
FIG. 8 illustrates an embodiment where hydraulic fluid from an unloading core can be directly fed to the inlet of the hydraulic pump.

FIG. 8 illustrates an embodiment where hydraulic fluid from an unloading core can be directly fed to the inlet of the hydraulic pump. This reduces the pressure difference required by the pump, as initially the fluid would enter at a high pressure and gradually decrease as the core unloads fully.

Referring to FIG. 8 in detail the hydraulic cylinders of two cores 20, 21 are linked through a valve 22. As one core unloads it initially supplies pressure and fluid to the second directly, similar to the previously described embodiment. Once the pressures equalise the remaining fluid is passed to the inlet 23 of a hydraulic pump 24 which increases the fluid pressure and supplies the loading core with its required remaining pressure. This embodiment reduces the number of valves required to achieve work recovery however multiple valves may be used with this circuit to further increase the direct supply between cores, reducing the operating flowrate of the hydraulic motor.

Figure 9:
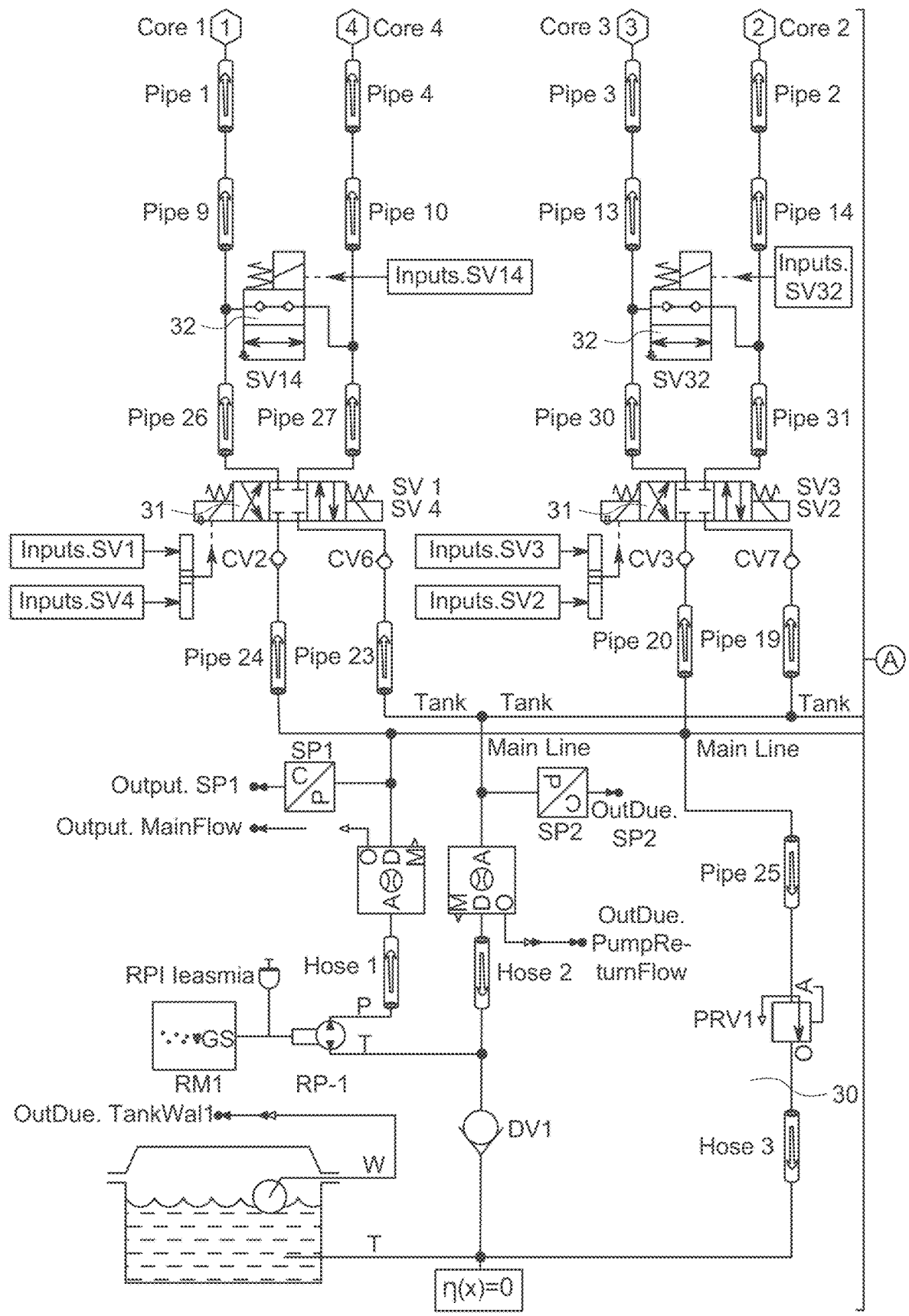
FIG. 9 illustrates a multiple core system where eight cores are shown utilising a single hydraulic pump and a single pressure sharing link valve.
Figure 9:
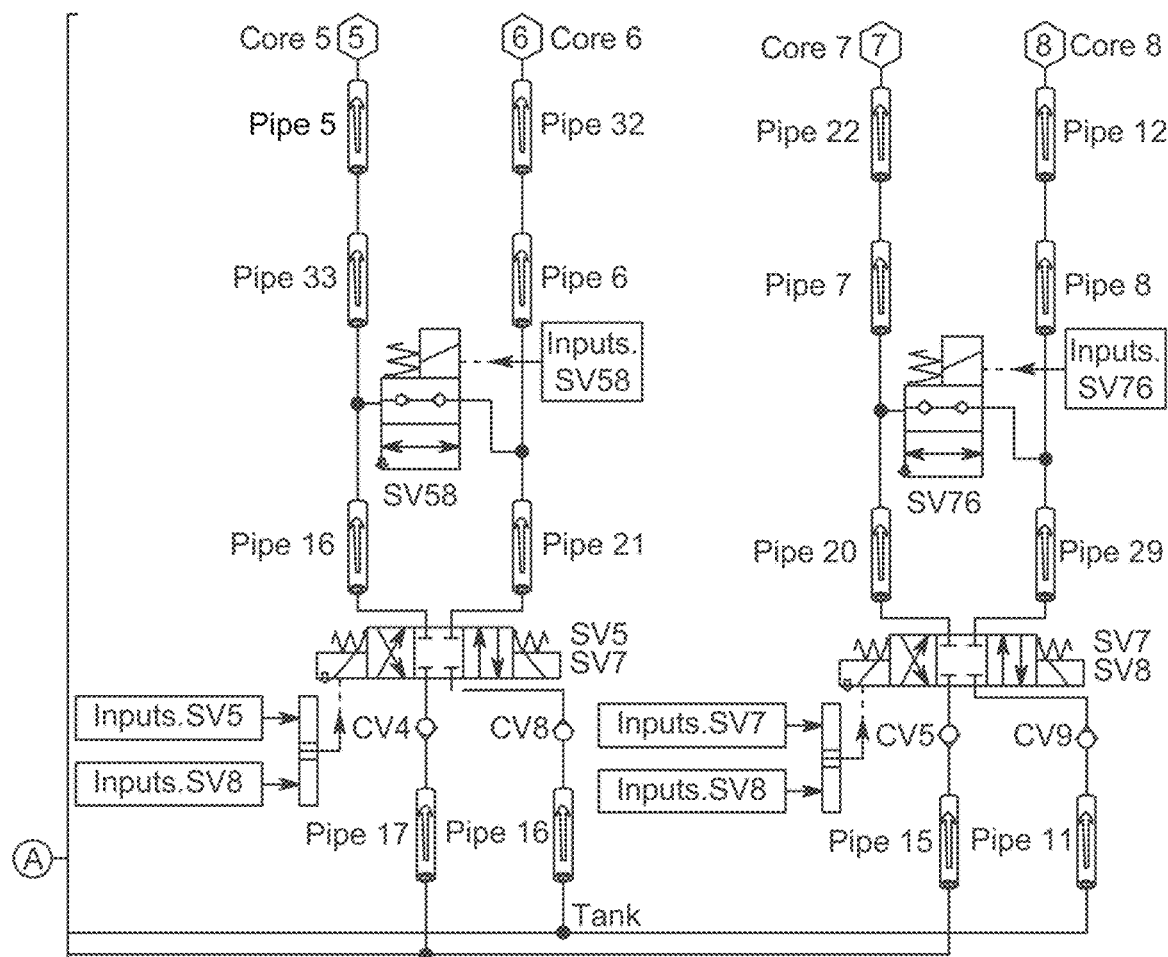

FIG. 9 illustrates a multiple core system where eight cores are shown utilising a single hydraulic pump 30, a single pressure sharing link valve 31 between cores and hydraulic check valves 32 in order to prevent back pressurization from core when not desired. In this embodiment each core operates $\frac{1}{8}^{th}$ out of phase to ensure constant supply to and from the hydraulic pump.

Figure 10:
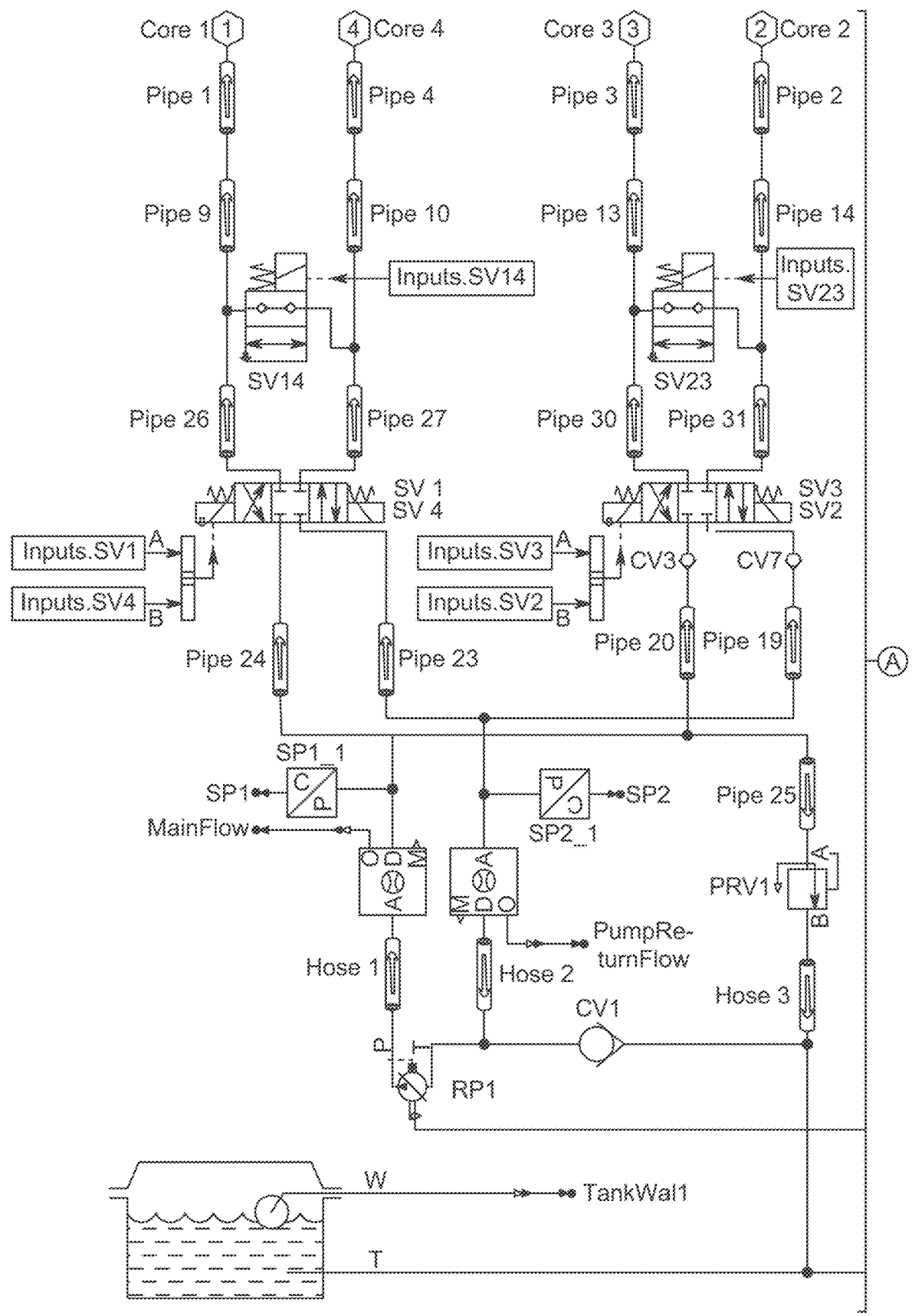
FIG. 10 illustrates how four cores can operate through a single pump which ensure no core cross over.
Figure 10:
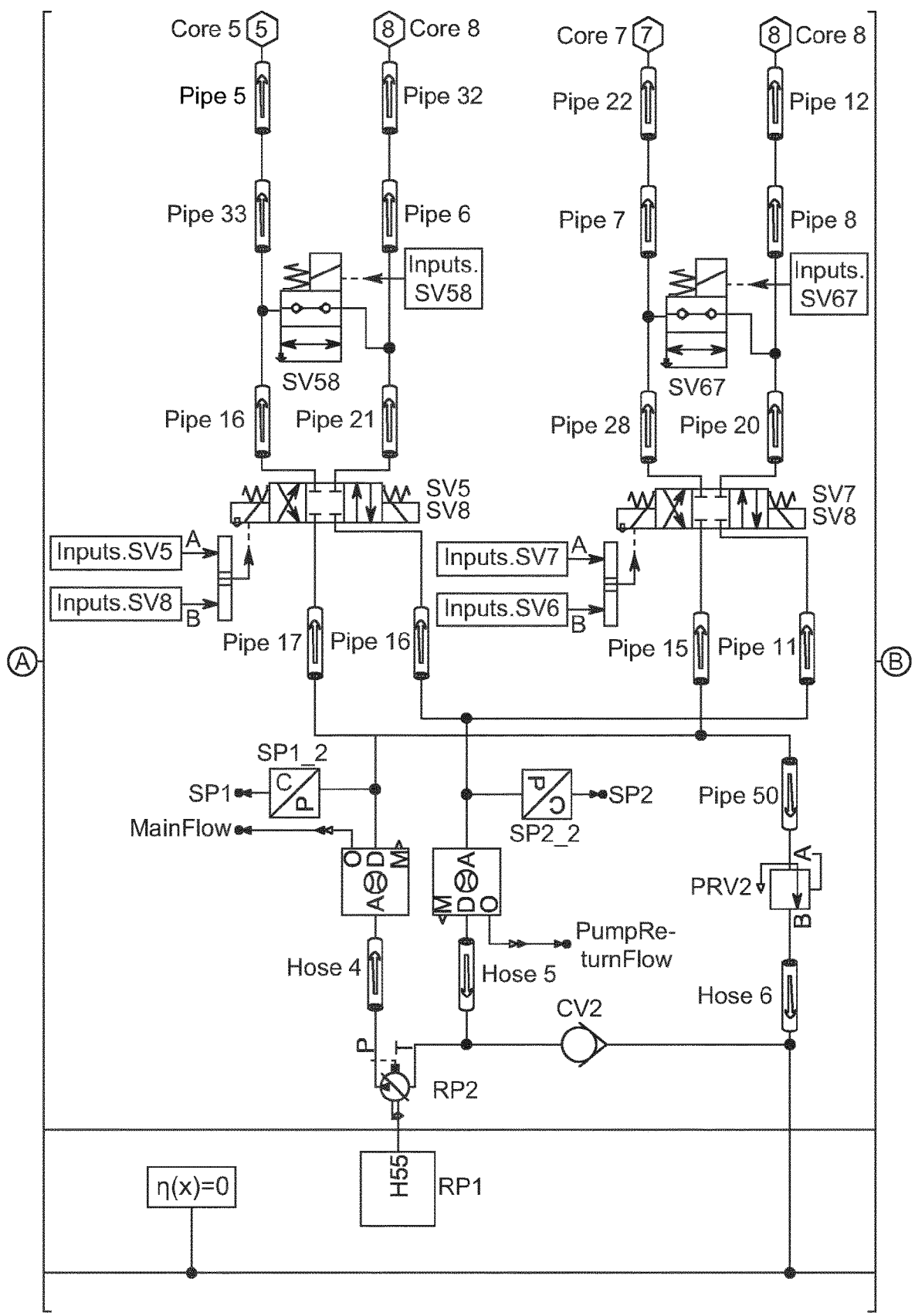
Figure 10:
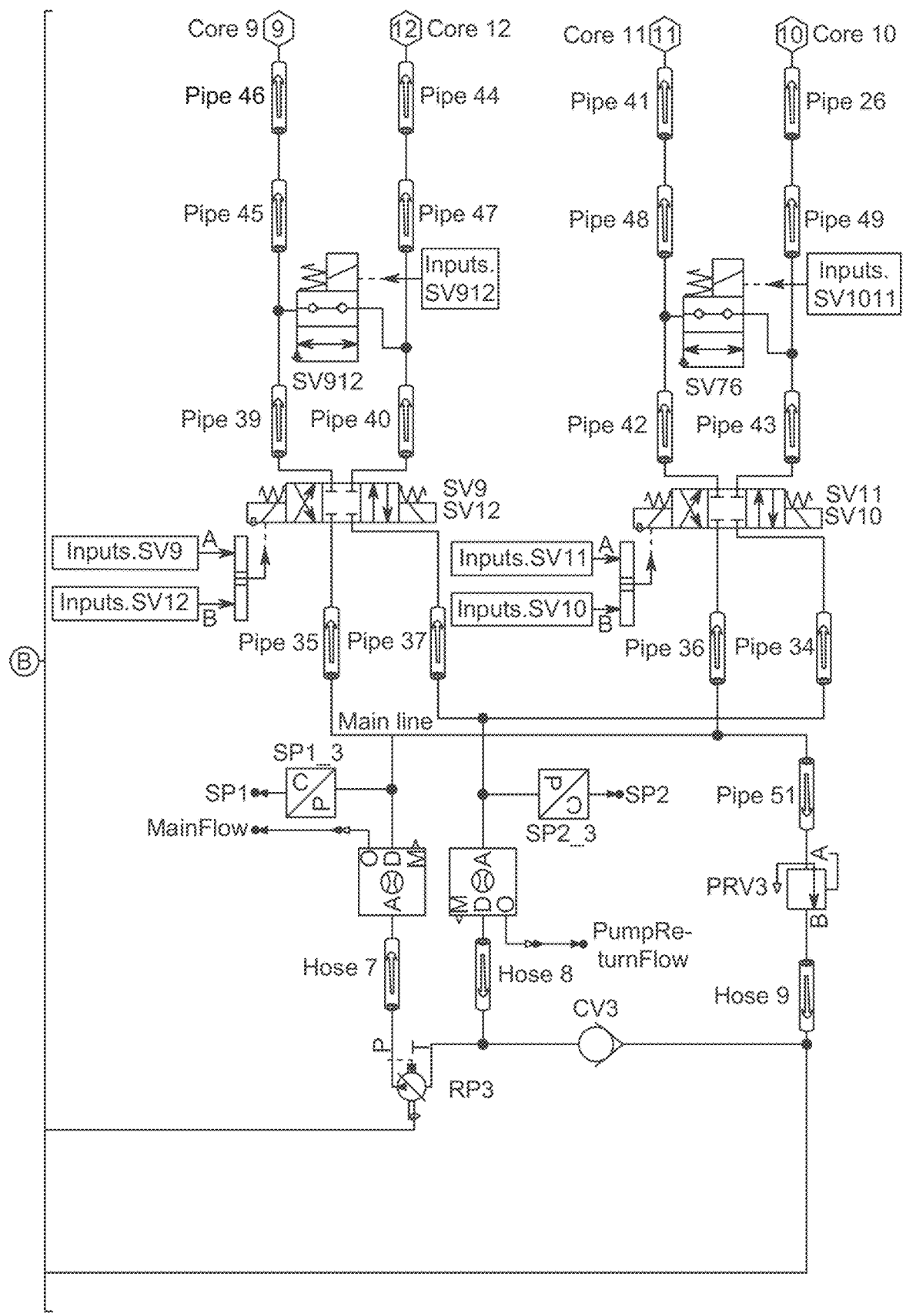

FIG. 10 illustrates how four cores can operate through a single pump which ensure no core cross over, removing the need for check valves and therefore further increasing the efficiency of the system. FIG. 10 shows a twelve core circuit with a single pump for each nested four core arrangement and operating from a single motor.

Figure 11:
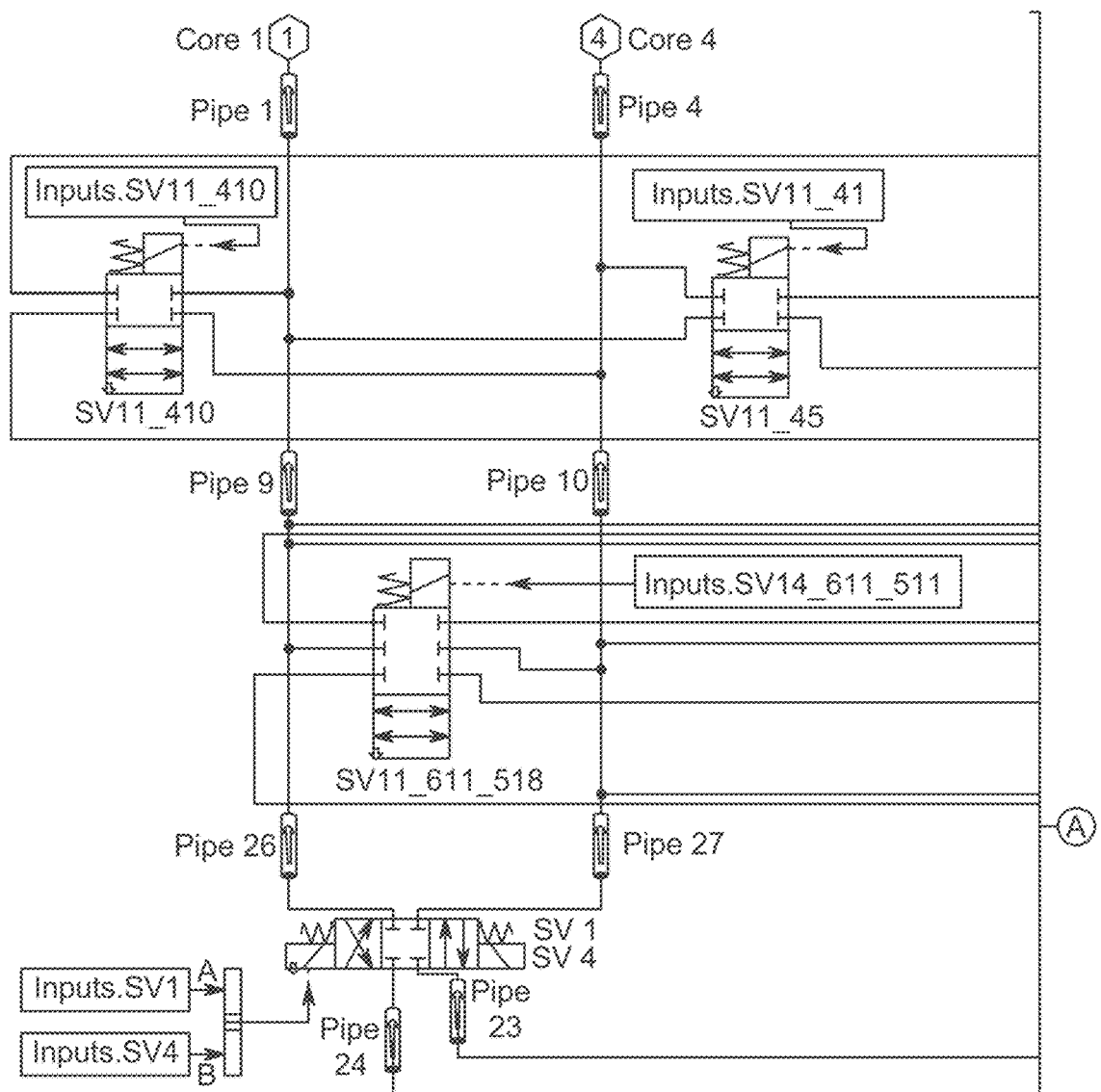
FIG. 11 illustrates a twelve core system and utilises several cross over valves with just a single pump.
Figure 11:
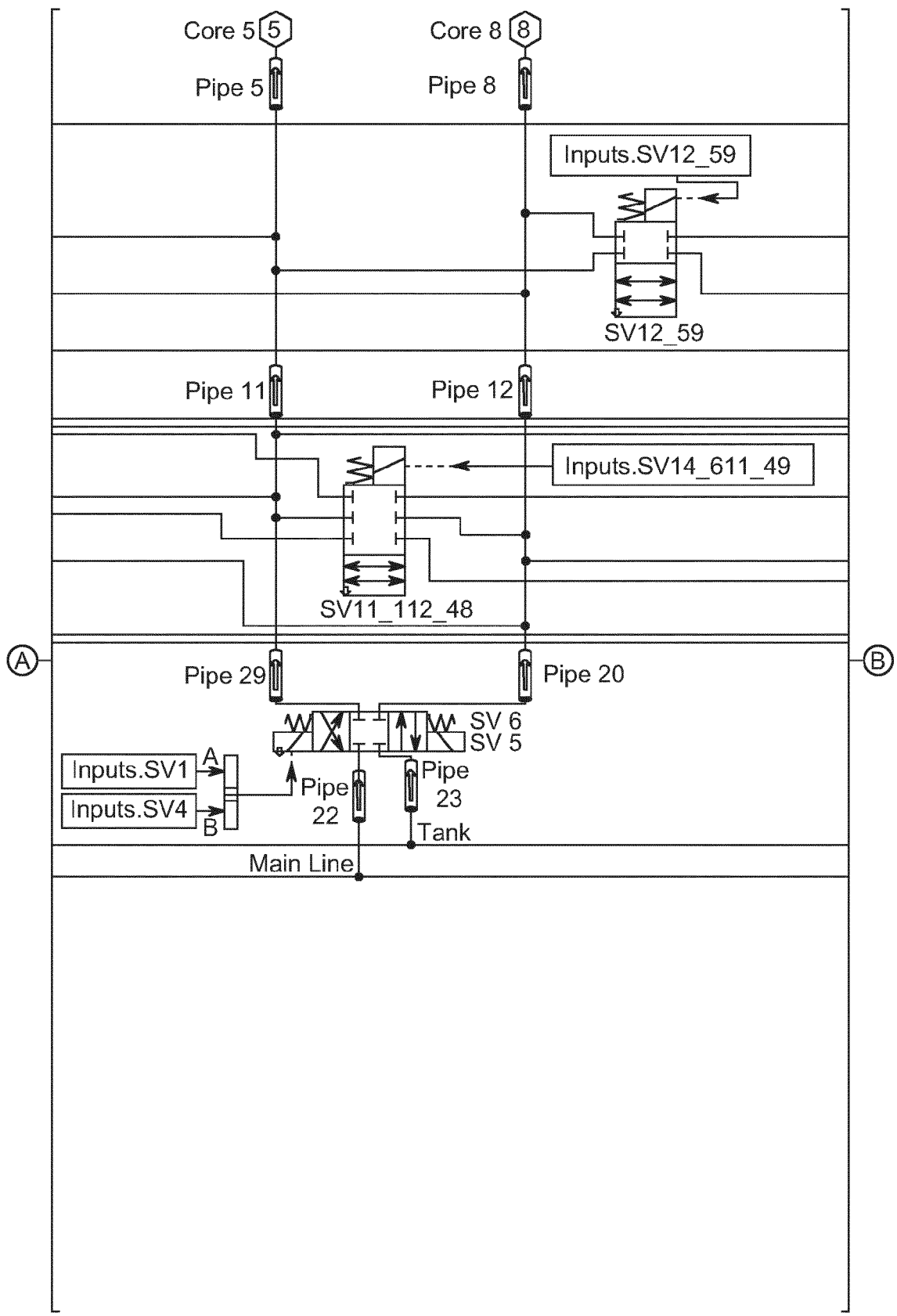
Figure 11:
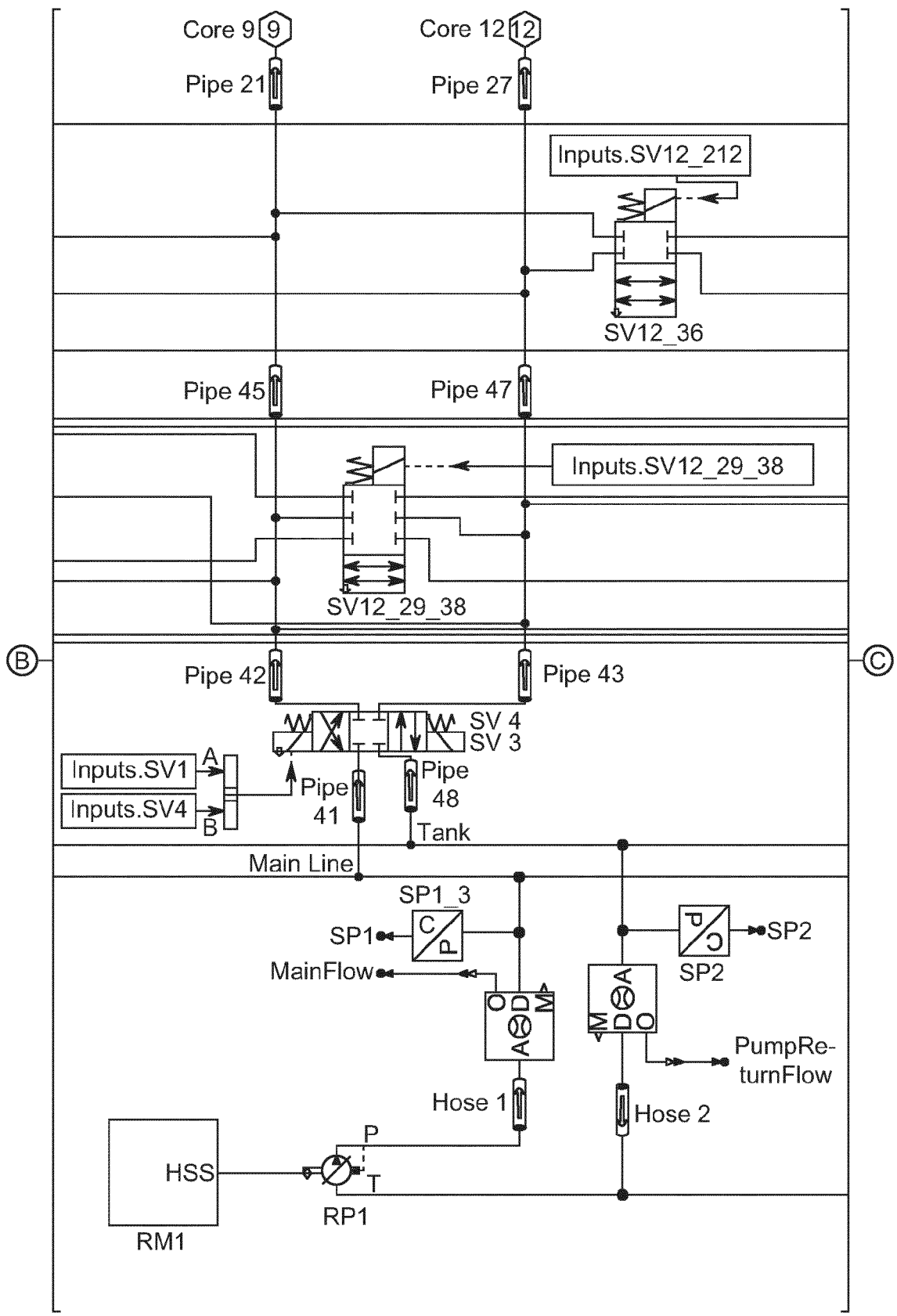
Figure 11:
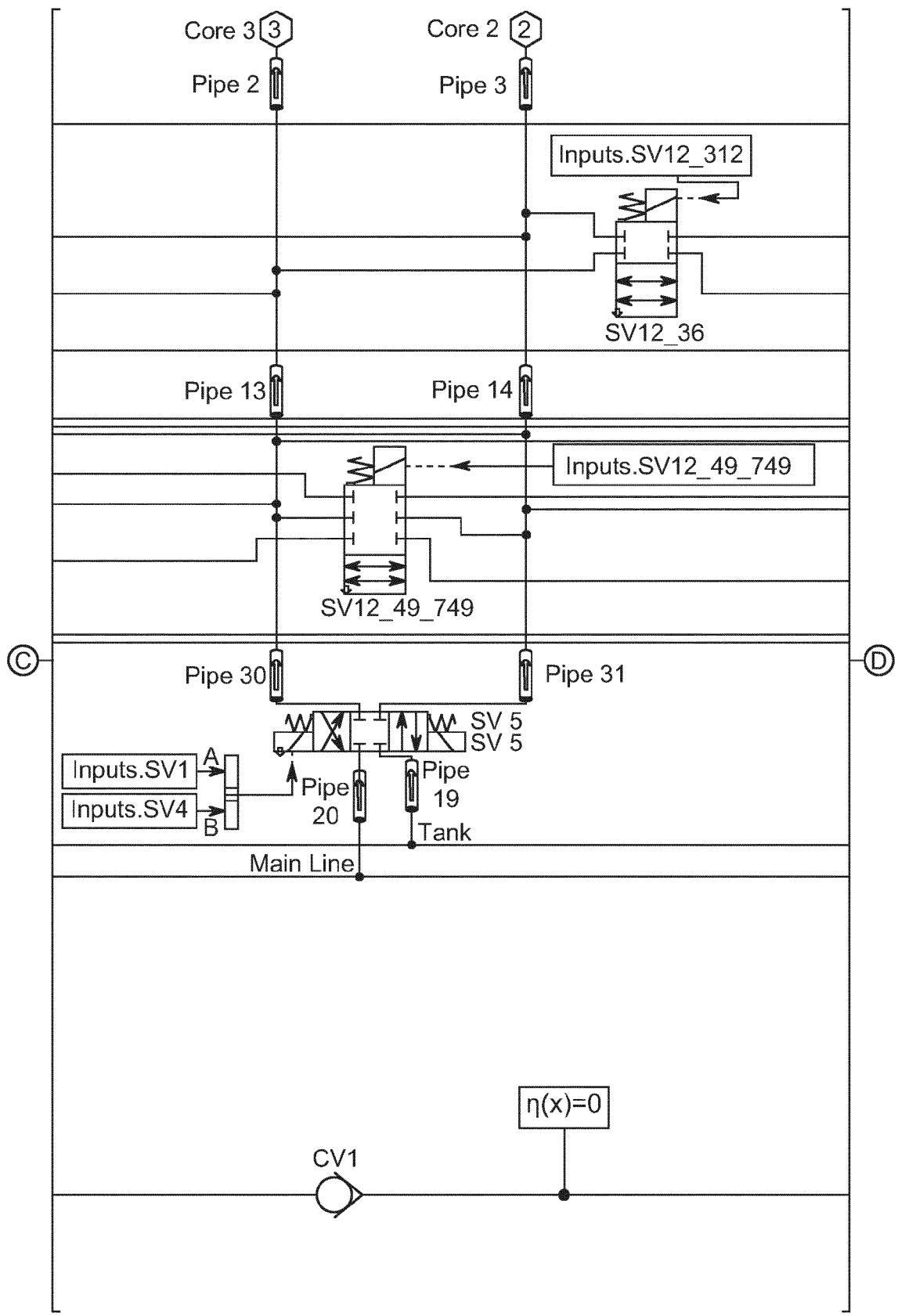
Figure 11:
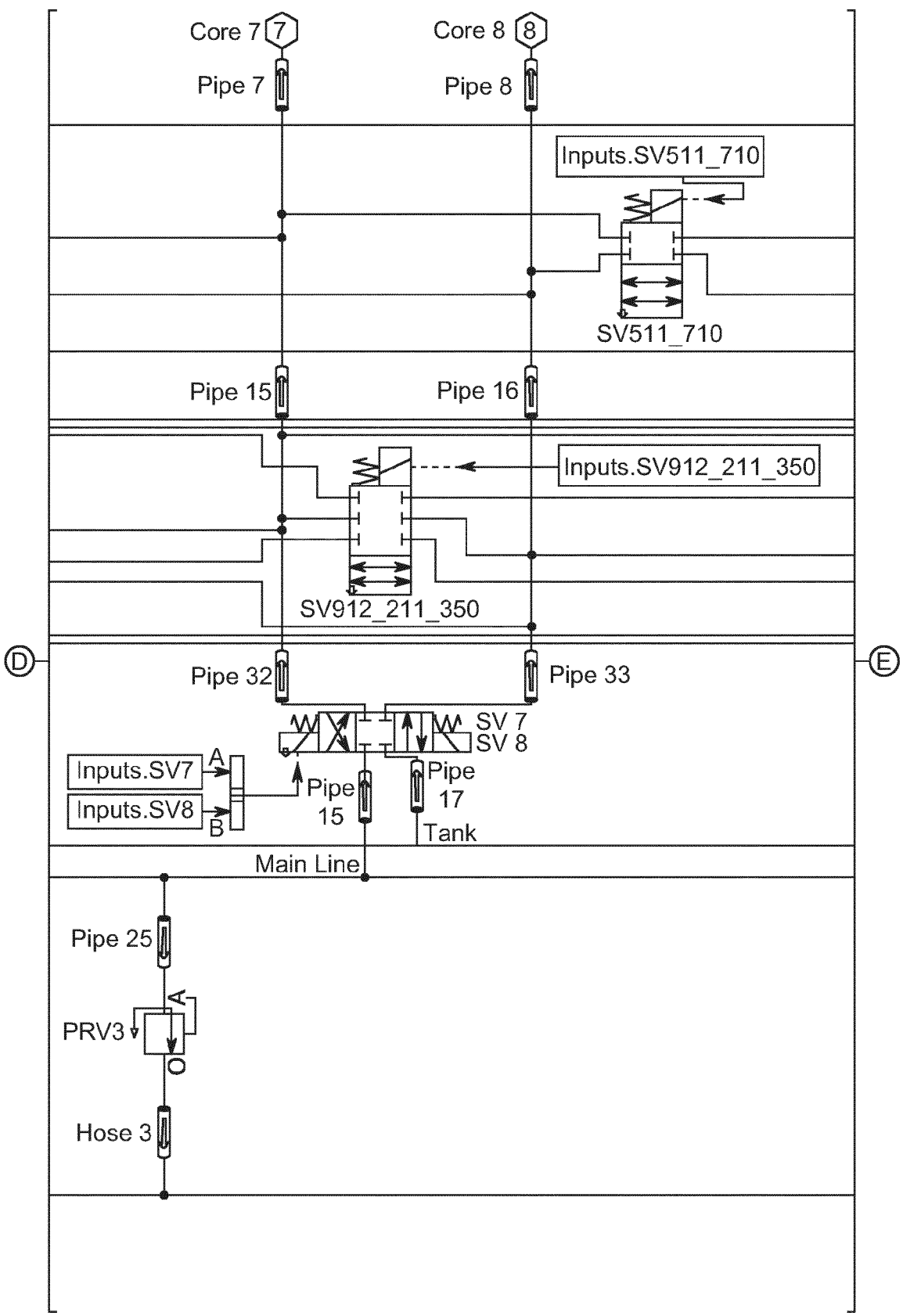
Figure 11:
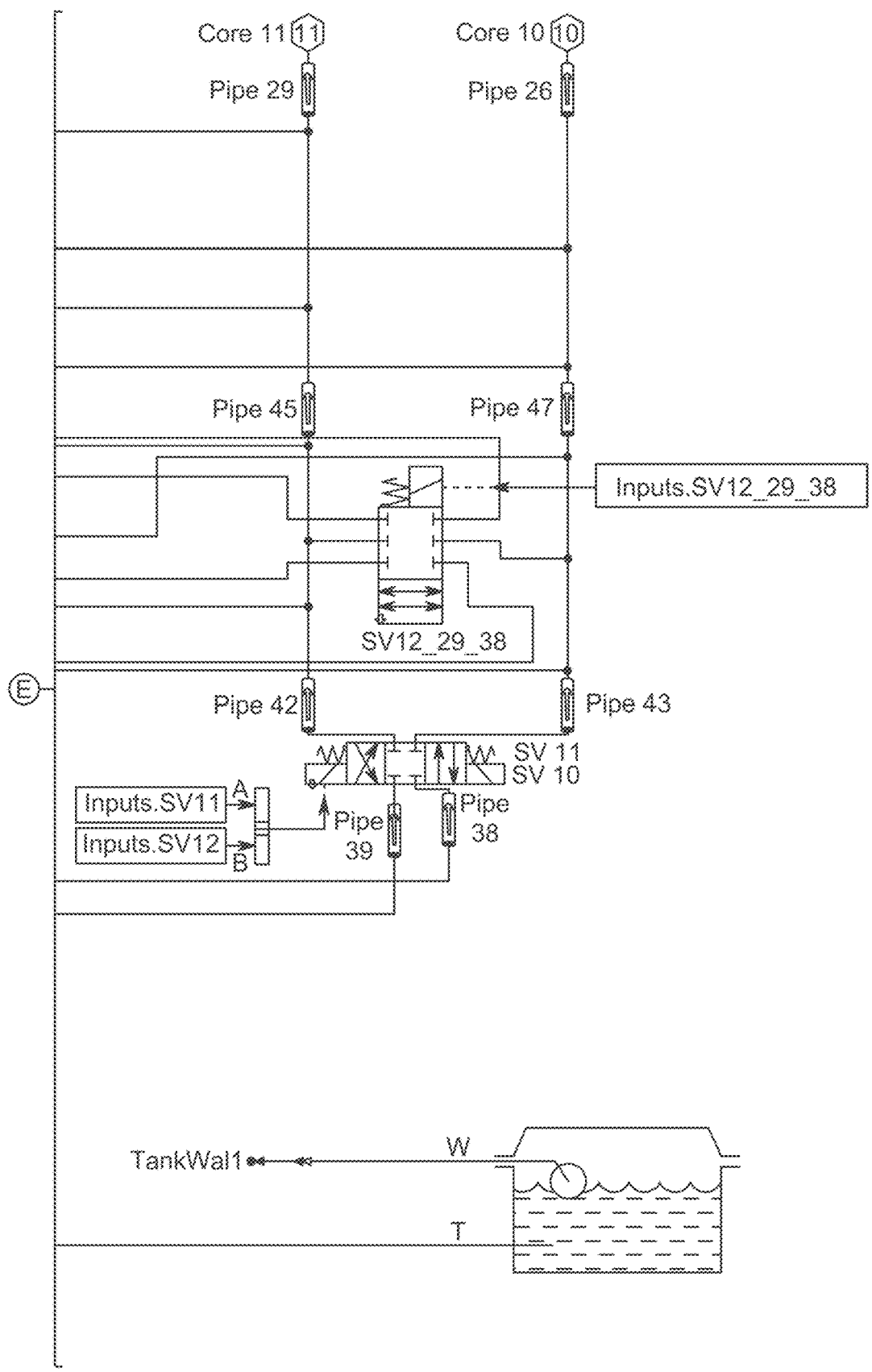

FIG. 11 utilises several cross over valves with just a single pump and illustrates a twelve-core system where each core operates $\frac{1}{12}^{th}$ out of phase. Five cores are used to share pressure directly before the final fluid is supplied to the hydraulic pump for recirculation.

Heat Pump Load Control Embodiment

Figure 12:
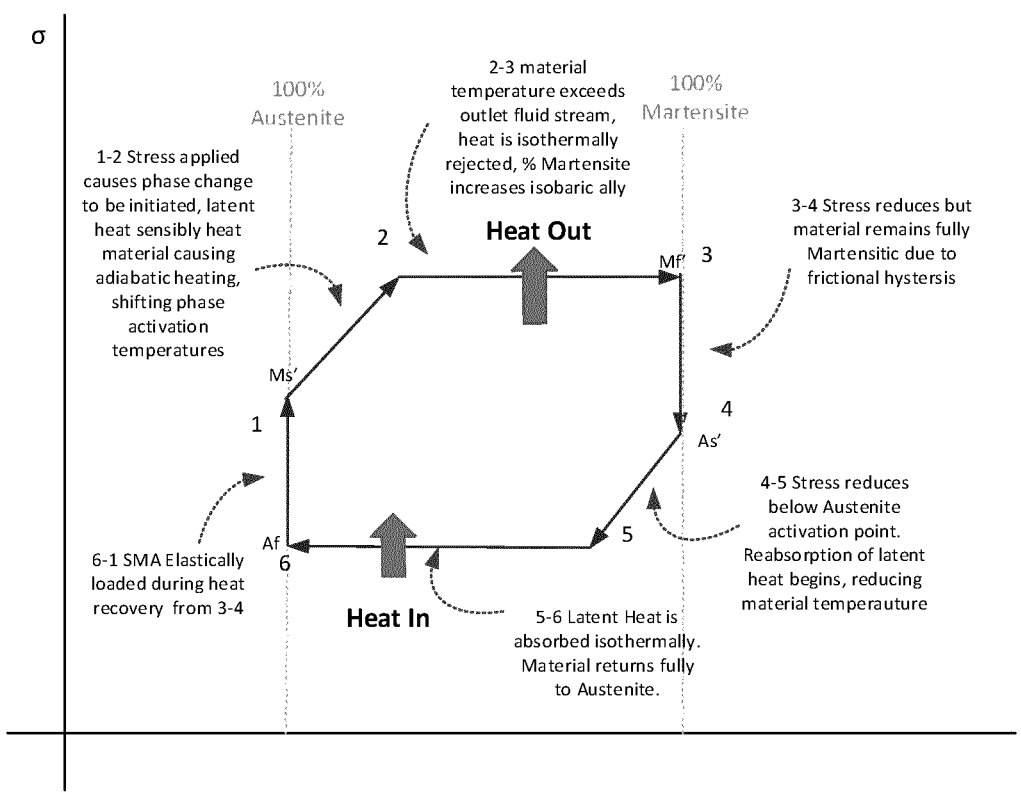
FIG. 12 illustrates the operation cycle of FIG. 2 in terms of material stress vs strain, according to one embodiment of the invention.

FIG. 12 illustrates the operation cycle of FIG. 2 in terms of material stress vs strain, according to one embodiment of the invention. Between point 6-1 the material stress is increased. However, the load does not activate the martensite phase activation point (Ms') as doing so would cause heat to be rejected to the heat recovery circuit and therefore reduce the efficiency of the system. The same is true for point 3-4 where the load reduction prevents the austenite activation point (As's) to be initiated as this would remove heat from the heat recovery circuit. However, between point 1-2 the load must be increased to cause heat rejection but then held constant between 2-3 for isothermal heat rejection. Also, at point 4-5 the load must be reduced below As' and then head constant between 5-6.

In order to achieve these types of load profiles in a hydraulic circuit an electro-proportional control valve/regulator is implemented to control hydraulic pressure or flow and therefore material stress. The electro-proportional control valve/regulator allows the cycle pressures to be adjusted to varying temperatures or heat demands. Also, in situations where the heat recovery circuit must be reheated due to thermal losses, this device can be used to control material heat rejection between 6-1 or heat absorption between 3-4.

Figure 13:
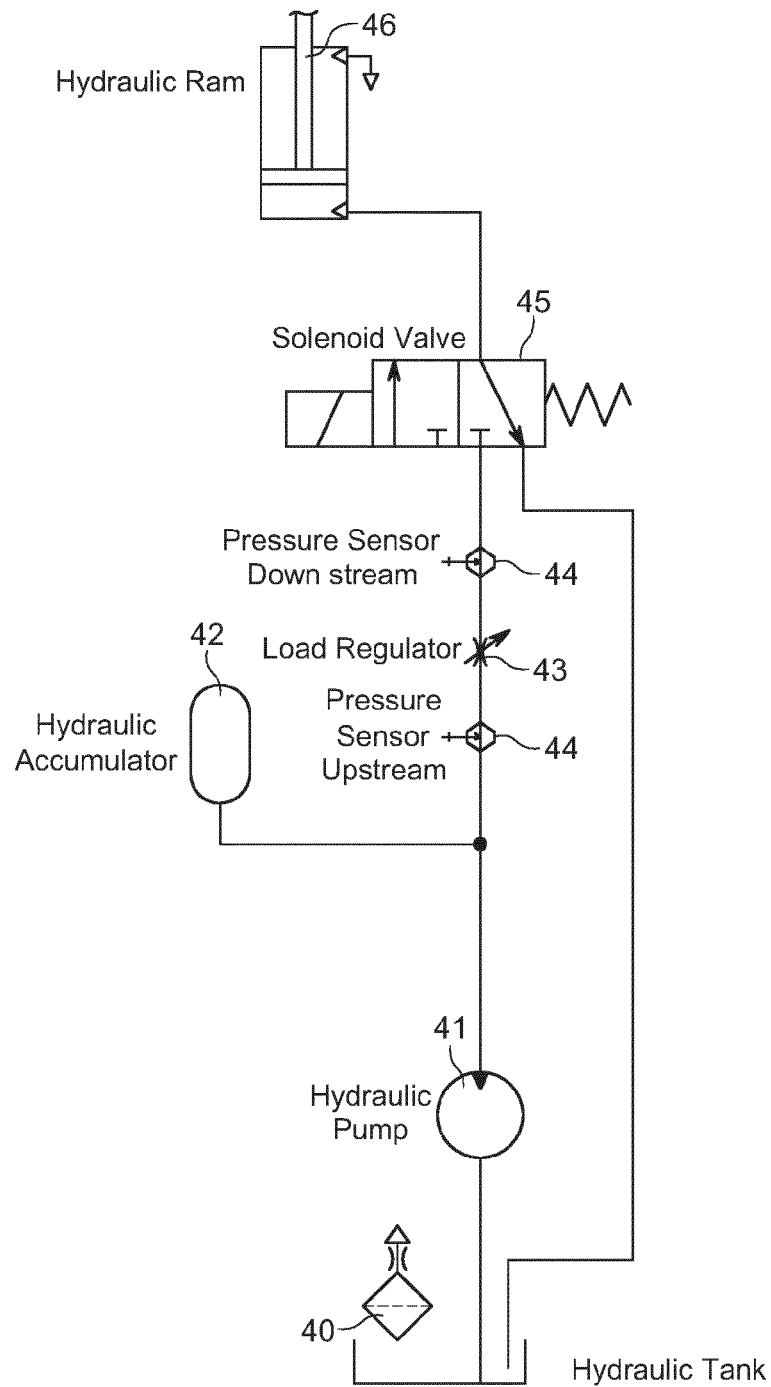
FIG. 13 illustrates a tank circuit or similar device positioned in series between the first core and second core.

FIG. 13 shows a hydraulic circuit configured to achieve the level of control required for a single hydraulic ram without work recovery, according to one embodiment of the invention. FIG. 13 shows a hydraulic fluid stored at low pressure in a hydraulic tank 40 which is fed through a hydraulic pump 41 where pressure is increased. This high-pressure fluid is stored in an accumulator vessel 42 until required. A load regulator 43 is operated by a control system which uses the pressure readings from both upstream/down stream pressure sensors and/or other sensors 44. The sensors 44 can be positioned in a housing or at an inlet or outlet. The sensors determine the appropriate response to regulate the pressure or fluid downstream. A solenoid valve 45 can also be included downstream. The valve 45 allows the pressure on the hydraulic ram 46 to be regulated by the load regulator or open to the hydraulic tank 40 to remove all load. The hydraulic ram 46 provides the appropriate stress at the appropriate time to the core during each cycle.

Figure 14:
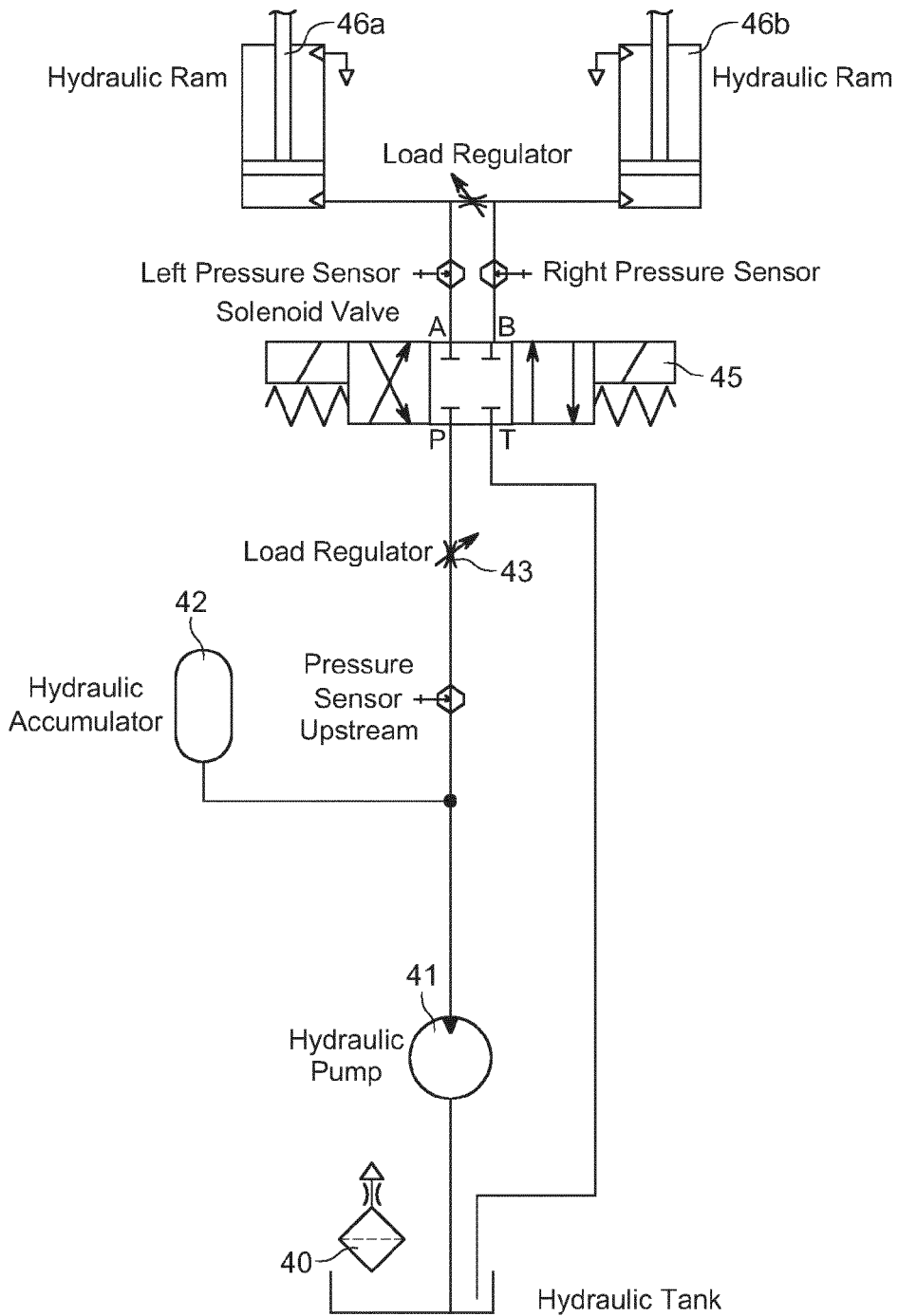
FIG. 14 illustrates an ideal cycle for operation of the invention outlined in the T-s, where the two interacting cores are arranged in a cascade formation.

An alternative scheme to FIG. 13 is shown in FIG. 14 where more than one cylinder is required. In this configuration the solenoid has three positions. Moving this valve to the very left causes load to be applied to the right core from the main regulator and the load to be completely removed on the left core. Moving to the very right places load on the left ram and remove load completely from the right. If the value is positioned in the middle all ports are blocked. This allows a second regulator between the cores to be used to control loading between cores for work recovery which would be point 3-4 and 6-1 in FIG. 12. The position of this regulator is controlled by a control system which uses the pressure sensor readings of each core and possibly temperature and time.

It will be appreciated that the heat pump system and method as described herein has many applications and can be used in heating (space heating, heat boilers systems or hot water); cooling (air conditioning water coolers, process cooling), reversible heating and cooling (in buildings or in automotive application); refrigeration (domestic and commercial/retail) cryogenic cooling. The heat pump system and method can effectively be applied to any heating or cooling system.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A heat pump system comprising:
a first Shape-Memory Alloy (SMA) or Negative Thermal Expansion (NTE) or elastocaloric material core adapted to convert movement of the core into energy in response to a temperature change;
a second Shape-Memory Alloy (SMA) or Negative Thermal Expansion (NTE) or elastocaloric material core in fluid communication with the first core and adapted to convert movement of the second core into energy; and
a third Shape-Memory Alloy (SMA) or Negative Thermal Expansion (NTE) or elastocaloric material core in fluid communication with the first and second cores and adapted to convert movement of the third core into energy,
wherein the first core, second core and the third core are arranged in series and a control system provides waste pressure from the first core to the second core and/or third core.

2. The heat pump system of claim 1, wherein the second and third core comprises a positive pressure gradient, with each core reaching equilibrium at a lower pressure by utilising the waste pressure available in the first core.

3. The heat pump system of claim 1, further comprising an accumulator wherein pressure is accumulated in the accumulator in preparation for release into a core requiring loading to ensure that the rate of heat change is maximised.

4. The heat pump system of claim 1, wherein the control system comprises an intensifier.

5. The heat pump system of claim 4, wherein the intensifier comprises a reverse intensifier configured with two interconnected areas subject to pressure.

6. The heat pump system of claim 4, wherein the intensifier is in communication with the first core, second core and third core.

7. The heat pump system of claim 1, further comprising a hydraulic motor and electrical generator where the waste pressure is converted into electricity which is subsequently used for to operate the electrical load required to operate the heat pump system.

8. The heat pump system of claim 1, further comprising a fourth Shape-Memory Alloy (SMA) or Negative Thermal Expansion (NTE) core or elastocaloric material core in fluid communication with the first, second and third cores and adapted to convert movement of the fourth core into energy.

* * * * *